No. 640,136. Patented Dec. 26, 1899.
R. D. HUME.
SOLDERING MACHINE.
(Application filed Apr. 8, 1899.)

(No Model.) 2 Sheets—Sheet I.

Witnesses.
Inventor.
Robert D. Hume
by Spear Seely Attorney

THE NORRIS PETERS CO., PHOTO-LITHO., WASHINGTON, D. C.

No. 640,136. Patented Dec. 26, 1899.
R. D. HUME.
SOLDERING MACHINE.
(Application filed Apr. 8, 1899.)
(No Model.) 2 Sheets—Sheet 2.
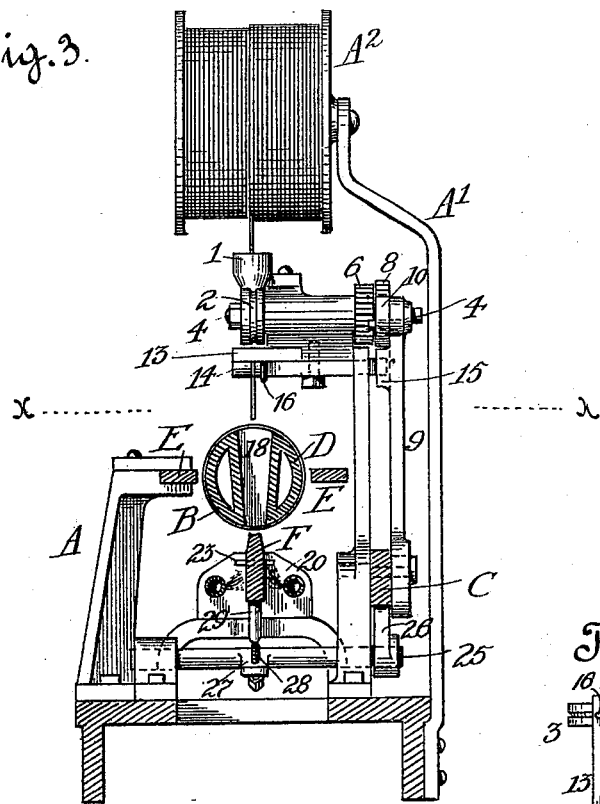
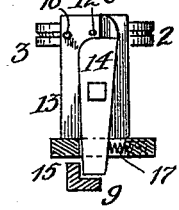
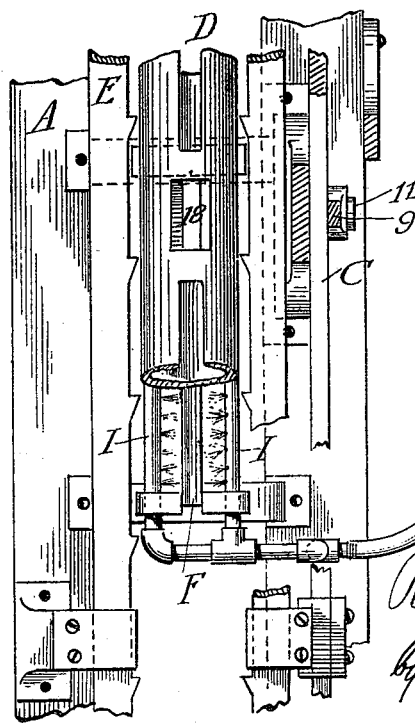
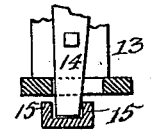
Witnesses. Inventor.
Robert D. Hume
by Spear & Seely
Attorneys

UNITED STATES PATENT OFFICE.

ROBERT D. HUME, OF GOLD BEACH, CALIFORNIA.

SOLDERING-MACHINE.

SPECIFICATION forming part of Letters Patent No. 640,136, dated December 26, 1899.

Application filed April 8, 1899. Serial No. 712,322. (No model.)

*To all whom it may concern:*

Be it known that I, ROBERT D. HUME, a citizen of the United States, residing at Gold Beach, in the county of Curry and State of California, have invented certain new and useful Improvements in Soldering-Machines, of which the following is a specification.

My invention relates to the manufacture of sheet-metal ware, and more particularly to machines for soldering the side seams of such ware.

The object of my invention is to furnish a machine for soldering lock-seams entirely from the outside and in a complete and thorough manner, and thus to avoid the objections that are sometimes made to inside soldering.

The mechanical structure in which I have embodied my invention is adapted for use in many kinds of can-making machines or in connection with them; but as a matter of convenience in description and illustration I have shown it as applied to such a can-machine as is shown, for instance, in Letters Patent No. 576,120, granted to me February 2, 1897.

Figure 1:
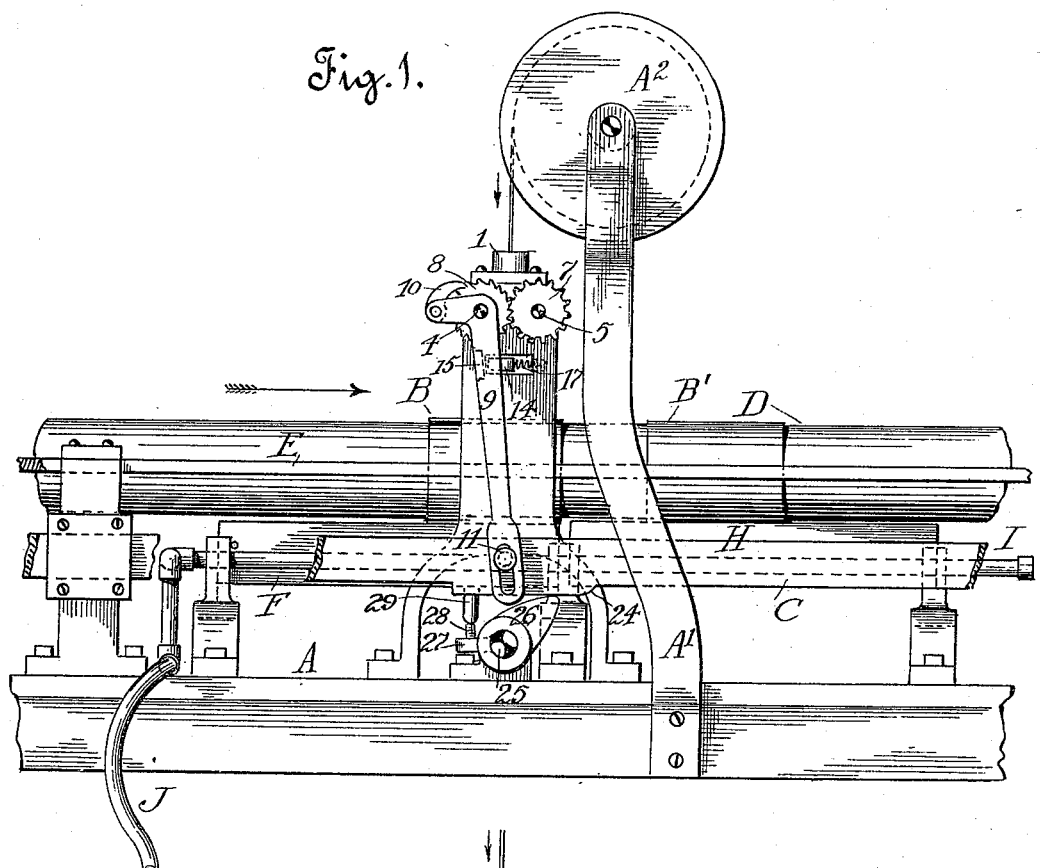
Figure 2:
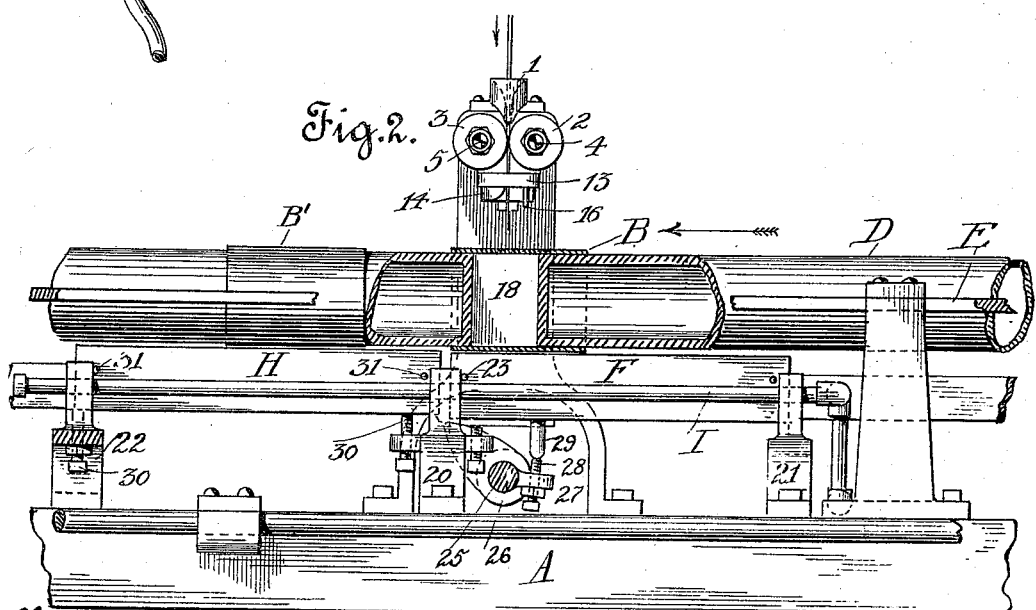

In the accompanying drawings, Figure 1 is a side elevation of part of a can-making machine with my invention applied thereto. Fig. 2 is an elevation of the same from the opposite side. Fig. 3 is a cross-section of the can-machine, showing the soldering devices partly in section and partly in end elevation. Fig. 4 is a top plan. Fig. 5 is a bottom view of the solder-cutter. Fig. 6 is a modification of the same.

A represents a main frame supposed in this case to support the mechanism of a can-machine.

D is a hollow horn or mandrel which is a support for tubular open-ended can-bodies, (shown at B B'.) These bodies are moved intermittingly or step by step along the horn by carriers E, which derive a reciprocating movement from the side bar C, connected to a driving-shaft, (not shown,) and which reciprocates parallel with the horn. On a standard A' of the main frame is a reel A² for solder-wire. The solder-wire is fed down through a guide 1 and between two grooved feed-rolls 2 and 3, which are placed so closely together as to partially flatten the solder-wire to cause it to melt quickly. The shafts 4 and 5 of these rolls carry the intermeshing gears 6 and 7, while the shaft 4 also carries a ratchet-wheel 8. The ratchet and gears are operated by a lever 9 and pawl 10, the lever carrying the pawl and being loose on the same shaft 4. The free end of the lever has a slot-and-pin connection at 11 with the side bar C. After passing between the rolls the solder-wire extends through a guide-hole 12 in a die-plate 13, in connection with which operates the solder-cutter 14. This knife is pivoted on the lower surface of the die-plate, Fig. 5, and is operated by the side bar C at its forward stroke (arrow in Fig. 1) through the agency of a projection 15 on the lever 9. A stop 16 limits the movement of the cutter, and a spring 17 restores it to normal position at the rear stroke of the side bar. The cutter shears or severs the wire at the lower surface of the die-plate, and the severed piece falls. Beneath the solder-cutter the horn is slotted, as shown at 18, the slot having downwardly-converging walls, Fig. 3, in order to guide the severed piece to the soldering-bar F, which is situated directly beneath the slot 18. This bar has an upper concave surface to approximately fit the surface of the can and is held loosely in standards 20 21, so as to be movable up and down, in which movement it is guided by transverse pins 23. This bar is for applying solder to the outside of the side seam by contact therewith. A second stationary bar H sweats the solder into the seam, there being no excess of solder, as where a tank is used, but only enough supplied for a single seam. The concave bar forms a reservoir for the single piece of solder melted instantaneously by the heated iron and taken up by the can in surface contact. The forward end of the soldering-iron F is raised into contact with the can-seam at the forward stroke of the side bar C. For this purpose the side bar is provided with an offset 24. A rock-shaft 25 is journaled transversely in the main frame beneath the horn, which carries a cam 26. A lug 27, fixed to the shaft, Fig. 3, carries an adjustable screw-support 28, upon which rests a stud 29, secured to the bar F. This stud is placed somewhat nearer the end of the bar which receives the solder than its other end, Fig. 2.

At the commencement of the forward stroke of the side bar the end of cam 26 is resting against the normal edge of the side bar in advance of offset 24. It is held there by the weight of the soldering-iron F, whose forward end has dropped slightly from the horizontal. The movement of iron F is the same as if it were pivoted in standard 21, which it might actually be, as a matter of fact. At the end of the preceding forward stroke a piece of solder was cut and dropped near the forward end of the iron F, which solder during the back stroke was melted and now lies in a little puddle on the edge of the iron. During the said preceding stroke the can-body B was brought over the iron F, came to rest near its rear end, and remained at rest through the back stroke. During the first part of the present forward stroke this can-body could take no solder on account of the depression of the forward end of iron F, and hence could scoop no solder into its inside. When the forward end of the can-body has passed the pool of solder, the offset 24 strikes cam 26, the connections 27 28 lift the forward end of iron F into contact with the moving can B, which rubs along its surface, taking up the solder, such can being in the position of Figs. 1 and 2. By the same forward stroke can B is carried over and in contact with the stationary iron H, which sweats the solder thoroughly into the seam. This iron H is stationary in action, but is adjustable for varying thicknesses of sheet metal by means of adjusting-screws 30. It is held in the standards 20 22 and guided in adjustment by pins 31. When the can B has passed over the passage 18, the next piece of solder is cut and falls upon the iron. The working faces of the irons, which are shown as concave for round cans, may be flat when soldering square cans, the intention being to have them conform to the shape of the cans.

On the back stroke of the side bar (contrary to the arrows) the cam remains stationary, the offset 24 releases the cam 26, and the weight of the iron F restores the said cam to position against the normal edge of the side bar, and the solder-wire is fed between the rolls and flattened, but not cut.

Both soldering-irons are heated by outside gas-pipes I I, which are shown as supported by the brackets 20, 21, and 22. One of these gas-pipes extends along each side of the two irons and parallel with them, and both pipes are provided with burner-orifices in the sides next to the irons. J represents the gas-supply pipe which furnishes gas to both pipes I I. By this construction the seam is thoroughly soldered, and all objections arising from inside soldering are avoided.

In Fig. 6 is shown a slight modification, which consists in omitting the spring 17 and operating the solder-cutter positively in both directions by two lugs 15 on the lever 9.

My soldering attachment can be used with other types of can-machines or as a separate apparatus. I do not therefore limit myself to the exact construction herein described and shown, as I desire to avail myself of such modifications and equivalents as fall properly within the spirit of my invention.

Having thus described my invention, what I claim as new, and desire to secure by Letters Patent, is—

1. The combination with can-body-supporting means and with means for propelling such bodies along with their side seams horizontal, of a soldering-iron below said supporting means, means for heating said iron, means for delivering solder to the upper edge of said iron, and means for moving the said iron bodily into contact with the can-body.

2. The combination with a support for can-bodies and with means for moving said bodies with their side seams horizontal, of a soldering-bar beneath said support, a solder-supplying device above said support, and a passage for delivering solder from the supplying device to the edge of the soldering-iron.

3. The combination with can-body-supporting means, of a vertically-movable soldering-iron below said supporting means, means for delivering solder to its edge, means for lifting said iron bodily into contact with the can-body, and means for propelling said can-bodies along with their side seams horizontal.

4. The combination with a horn or mandrel forming a support for can-bodies, and provided with upper and lower slots in line, of a soldering-bar beneath and in line with said slots and a solder-delivering device above and in line with said slots.

5. The combination with a hollow horn or mandrel forming a support for can-bodies, and provided with upper and lower slots in line, of downwardly-converging interior walls forming in connection with said slots, a guide-passage, a soldering-bar beneath and in line with said passage, and a solder-delivering device above and in line with said passage.

6. The combination with can-body-supporting means, of a soldering-iron below said supporting means, means for delivering solder to the upper edge of said iron, means for moving said iron into contact with the can-body, a stationary iron beyond and in line with said movable iron, means for heating both irons, and means for moving the can-body with its side seam horizontal along and in contact with both irons.

7. An outside soldering device for the side seams of sheet-metal ware, comprising, a straight-edged soldering-bar movably supported, means for giving a pivotal movement to said bar, so as to raise one end of its edge into contact with the side seam, means for supplying solder to said edge and means for heating said iron.

8. An outside soldering device for the side seams of sheet-metal ware, comprising, a soldering-iron having its edge shaped to correspond with the surface of the can-body, and supported so as to be movable upwardly toward the side seam and downwardly from the side seam, means for so moving it, a second and stationary soldering-iron adjustably supported in line with the movable iron, means for delivering solder to the upper edge of the movable iron and means for heating both irons.

9. In a soldering-machine a horn or mandrel forming a support for can-bodies, and having a vertical guide-passage, in combination with a solder-feeding device and a solder-cutting device above said horn, and a soldering-iron below said horn, whereby the solder is cut and falls directly through said passage upon said iron.

10. In a soldering-machine the combination with a horn or mandrel, and means for propelling can-bodies along the same, of a soldering-iron movable toward and from said horn, a reciprocating side bar and connections from said side bar to the said iron for giving it the movement referred to.

11. In a soldering-machine the combination with a horizontal horn or mandrel, of a soldering-bar beneath the horn having one end normally depressed relatively to the horn, means for propelling can-bodies along the horn, means for lifting the depressed end of the soldering-iron into contact with the can-body, means for delivering solder to the edge of said iron, and means for heating the iron.

12. In a soldering-machine the combination with a horn and with a reciprocating side bar having an offset, of a rock-shaft carrying a cam adapted to be operated by said offset, a movable soldering-iron and a support on said rock-shaft for said movable iron.

In testimony whereof I have affixed my signature, in presence of two witnesses, this 17th day of March, 1899.

ROBERT D. HUME.

Witnesses:
L. W. SEELY,
GEO. T. KNOX.